United States Patent [19]

Katayama et al.

[11] Patent Number: 5,453,963
[45] Date of Patent: Sep. 26, 1995

[54] MAGNETO-OPTICAL HEAD SYSTEM FOR DETECTION OF ERROR AND INFORMATION SIGNALS BY DIFFRACTION LIGHTS

[75] Inventors: Ryuichi Katayama; Yutaka Yamanaka, both of Tokyo, Japan

[73] Assignee: NEC Corporation, Tokyo, Japan

[21] Appl. No.: 377,614

[22] Filed: Jan. 25, 1995

Related U.S. Application Data

[63] Continuation of Ser. No. 993,281, Dec. 18, 1992, abandoned.

[30] Foreign Application Priority Data

Dec. 18, 1991 [JP] Japan ................................. 3-333754
May 12, 1992 [JP] Japan ................................. 4-117840

[51] Int. Cl.$^6$ ................................................ G11B 7/095
[52] U.S. Cl. ............................. 369/44.23; 369/44.41; 369/112; 369/13
[58] Field of Search ........................... 369/44.14, 44.12, 369/44.23, 13, 112, 109, 110, 44.37, 44.38, 44.41, 44.12

[56] References Cited

U.S. PATENT DOCUMENTS

| | | | |
|---|---|---|---|
| 4,894,815 | 1/1990 | Yamanaka | 369/112 |
| 4,935,911 | 6/1990 | Ohichida et al. | 369/44.44 X |
| 5,015,835 | 5/1991 | Ohuchida et al. | 250/201.5 |
| 5,062,094 | 10/1991 | Hamada et al. | 369/44.41 X |
| 5,101,389 | 3/1992 | Ohuchida et al. | 369/112 X |
| 5,115,423 | 5/1992 | Maeda et al. | 369/110 X |
| 5,231,620 | 7/1993 | Ohuchida | 369/109 |

FOREIGN PATENT DOCUMENTS 0405444  1/1991  European Pat. Off. .

OTHER PUBLICATIONS

"Compact Magneto–optical Disk Head using a Holographic Optical Element with Analyzer Function", Akitomo Ohba et al., SPIE vol. 1316, Optical Storage, 1990, pp. 159–166.

Primary Examiner—W. R. Young
Assistant Examiner—Thang V. Tran
Attorney, Agent, or Firm—Sughrue, Mion, Zinn, Macpeak & Seas

[57] ABSTRACT

A magneto-optical head of the present invention has first and second diffraction gratings, for diffracting a reflection light reflected at a magneto-optical disk. Further, the system is provided with a photodetector for detecting an error signal and an information signal in accordance with the diffracted lights supplied from the diffraction gratings, respectively.

6 Claims, 10 Drawing Sheets

66
PHOTODETECTOR

FIG. 14
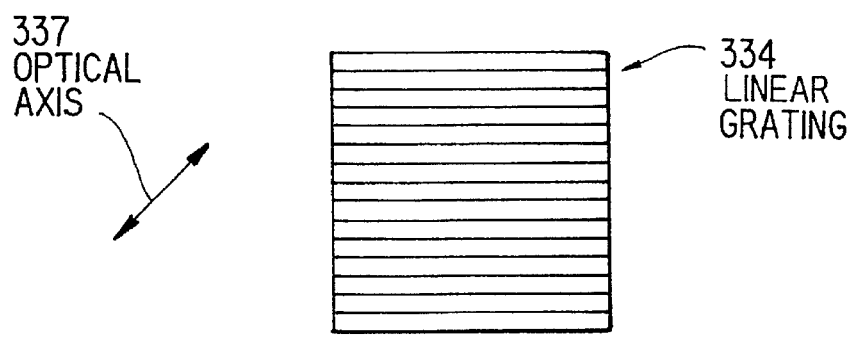
FIG.15A  FIG.15B
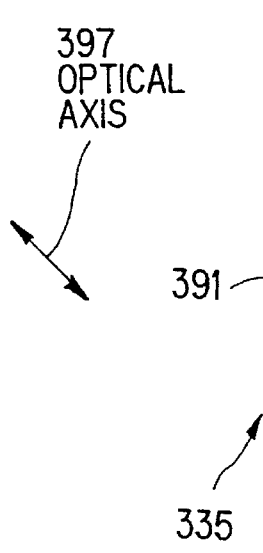 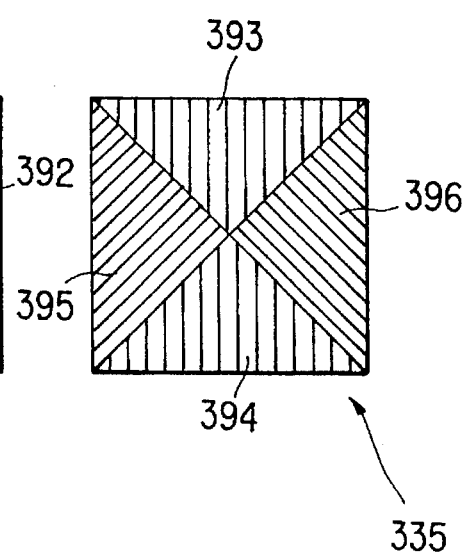

5,453,963

MAGNETO-OPTICAL HEAD SYSTEM FOR DETECTION OF ERROR AND INFORMATION SIGNALS BY DIFFRACTION LIGHTS

This is Continuation of application Ser. No. 07/993,281 filed Dec. 18, 1992 now abandoned.

FIELD OF THE INVENTION

This invention relates to a magneto-optical head system, and more particularly, to a magneto-optical head system with a function for detecting an error signal and an information signal by a light reflected at a magneto-optical disk.

BACKGROUND OF THE INVENTION

A conventional magneto-optical head system, which is shown in a Japanese Patent Publication For Inspection (Kokai) No. Heisei 3-29137, includes a semiconductor laser for irradiating a laser light, an objective lens for focusing the laser light to a magneto-optical disk, a beam splitter for transmitting the laser light from the semiconductor laser to the objective lens and reflecting a light reflected at the magneto-optical disk, a diffraction grating element for diffracting the reflection light to provide ordinary and extraordinary lights, and a photodetector for detecting tracking and focusing error signals and a stored information signal on the magneto-optical disk in accordance with the ordinary and extraordinary lights supplied from the diffraction grating element.

The diffraction grating element divides the reflection light into a zeroth order diffraction light (ordinary light) and +1st and −1st orders diffraction lights (extraordinary lights).

At the photodetector, an error signal is detected in accordance with the +1st order diffraction light, and an information signal is detected in accordance with zeroth, +1st and −1st order diffraction lights, or zeroth and −1st order diffraction lights.

According to the conventional magneto-optical head system, however, there are disadvantages in that the +1st order light must be divided into two components for each of an error signal and an information signal in case where the information signal is detected by using a zeroth and both of +1st and −1st order diffraction lights. As a result, the electric circuit becomes complicated in structure.

On the other hand, in the case where an information signal is detected by using a zeroth and a −1st order diffraction lights, the electric circuit may be fabricated to be simple in structure. However, intensity ratio between an ordinary light and an extraordinary light is imbalanced for detecting the information signal. That is, common mode noise on the detected signal is increased. As a result, an information signal can not be detected with high precision.

One solution to this problem is to make the intensity ratio between ordinary and extraordinary lights by adjusting the optical axis of the diffraction grating element to have a predetermined angle to a polarization plane of an incident light. However, a carrier level of the detected signal is decreased due to the changing of the optical axis, so that the reproduced C/N (ratio of carrier level to noise level) is decreased. As a result, an information signal can not be detected with high precision.

SUMMARY OF THE INVENTION

Accordingly, it is an object of the invention to provide a magneto-optical head system which can be fabricated to be simple in structure and can detect an error signal and an information signal with high precision.

According to the invention, a magneto-optical head system includes:

a light source for irradiating a predetermined light;

means for focusing the predetermined light on a magneto-optical disk;

means for collecting a reflection light reflected at the magneto-optical disk;

a first diffraction grating for diffracting a predetermined polarizing component of the reflection light;

a second diffraction grating for diffracting lights supplied from the first diffraction grating to provide a detecting light; and a photodetector for detecting an error signal and an information signal existing on the magneto-optical disk in accordance with said detecting light.

The other objects and features of the invention will be understood from the following description with reference to the accompanying drawings.

BRIEF DESCRIPTION OF THE DRAWINGS

FIG. 14 is a plan view showing a linear grating used in the third preferred embodiment shown in FIG. 13;

FIGS. 15A and 15B are plan views showing a holographic plate used in the third preferred embodiment shown in FIG. 13;

DESCRIPTION OF THE PREFERRED EMBODIMENTS

For better understanding of the background of the present invention, the basic principle of the conventional technology is first described hereinafter with reference to FIGS. 1 to 3 and FIGS. 4A, 4B and 4C.

Figure 1:
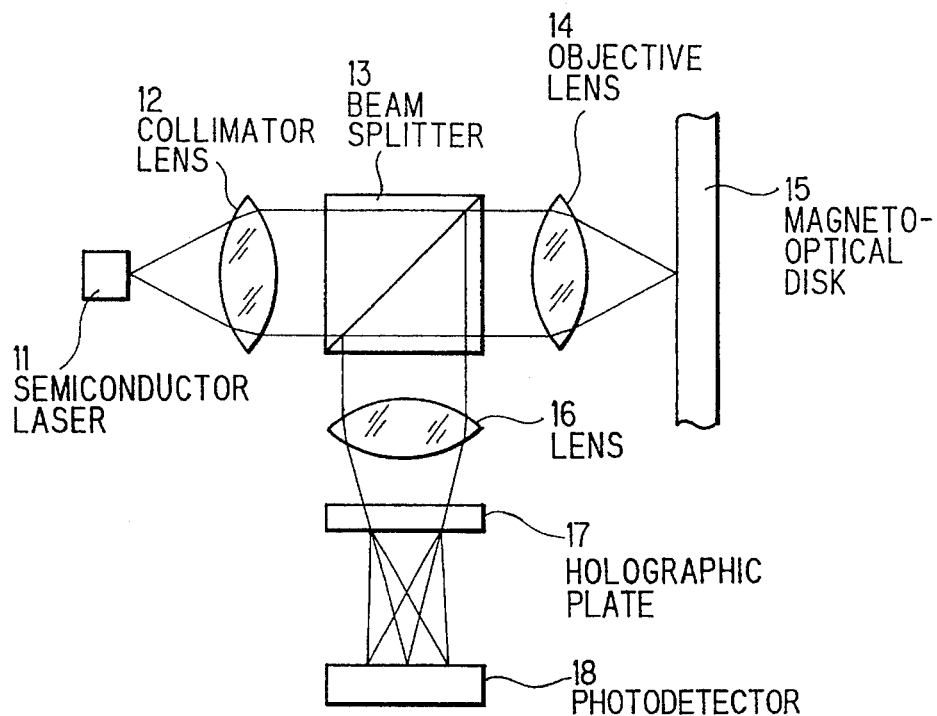
FIG. 1 is a schematic view illustrating a conventional magneto-optical head system.

FIG. 1 shows a conventional magneto-optical head system. The system includes a semiconductor laser 11, a collimator lens 12, a beam splitter 13, an objective lens 14, a lens 16, a holographic plate 17, and a photodetector 18.

Figure 2:
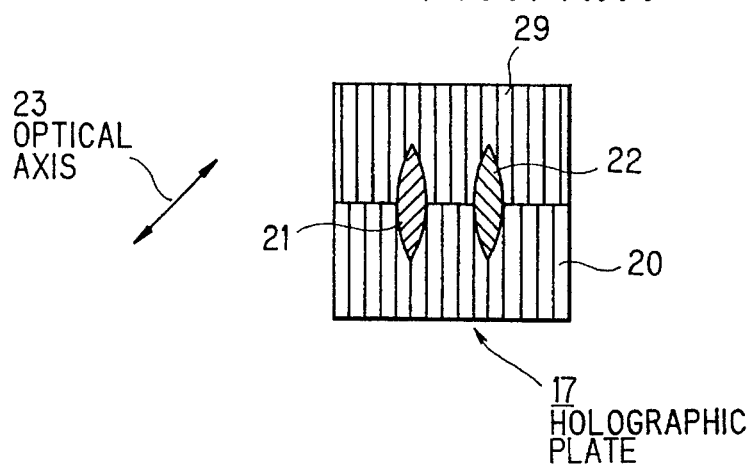
FIG. 2 is a plan view showing a holographic plate shown in FIG. 1.

FIG. 2 shows the holographic plate 17 which is divided into four regions 20, 21, 22 and 29 having different grating directions relative to each other.

Figure 3:
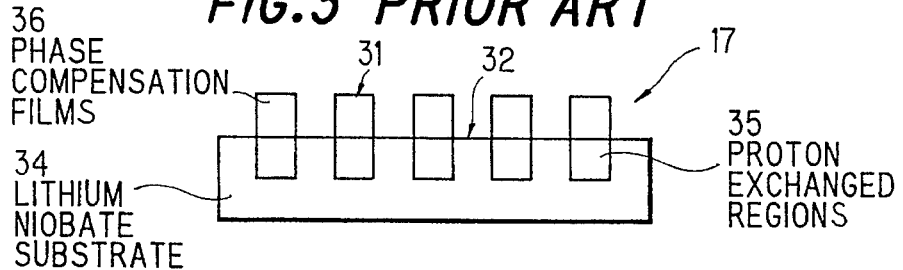
FIG. 3 is a cross sectional view showing the holographic plate shown in FIG. 1.

FIG. 3 shows the holographic plate 17 which includes a lithium niobate substrate 34 of a birefringent crystal, proton exchanged regions 35 formed on the substrate 34 and phase compensation films 36, which are of $Nb_2O_5$, formed on the proton exchanged regions 35. The proton exchanged regions 35 and the phase compensation film 36 form a double layer diffraction grating.

The holographic plate 17 is fabricated to provide an optical axis 23 having forty five degree to a polarization plane of an incident light.

The holographic plate 17 is fabricated to have line area 31 and space area 32, such that no phase difference occurs to a polarization component orthogonal to an optical axis 23, and a phase difference of $\pi$ occurs to a polarization component parallel to the optical axis 23. As a result, an ordinary light (the orthogonal polarization component) passes through the holographic plate 17 and an extraordinary light (the parallel polarization component) is diffracted thereat. That is, the phase difference is determined to be zero for an ordinary light having a polarization component orthogonal to the optical axis 23, and to be $\pi$ for an extraordinary light having a polarization component parallel to the optical axis 23.

Figure 4A:
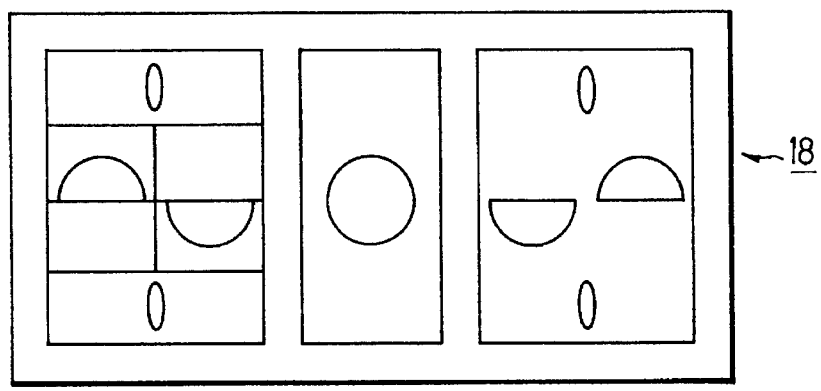
FIGS. 4A to 4C are plan views of a detecting pattern of a photodetector shown in FIG. 1, respectively.
Figure 4B:
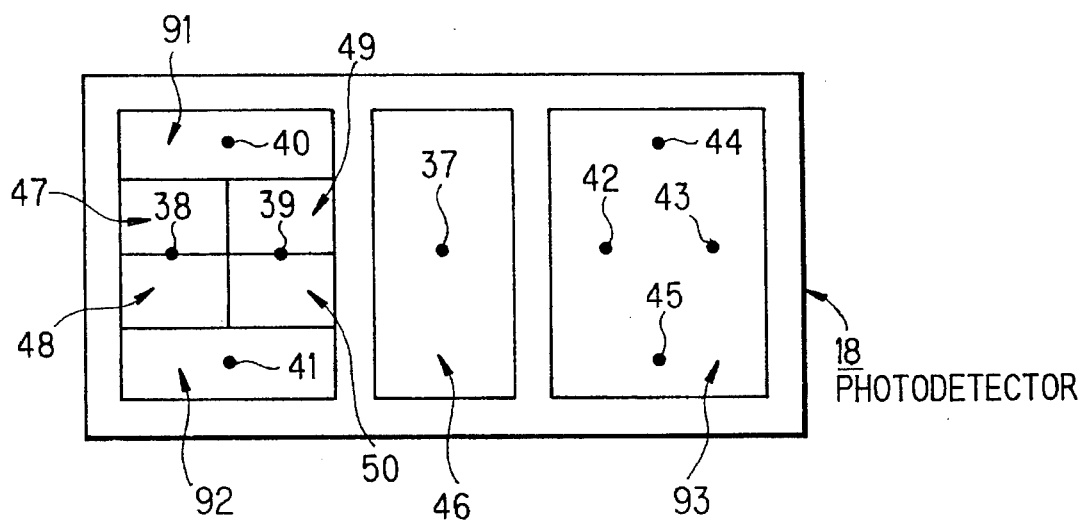
Figure 4C:
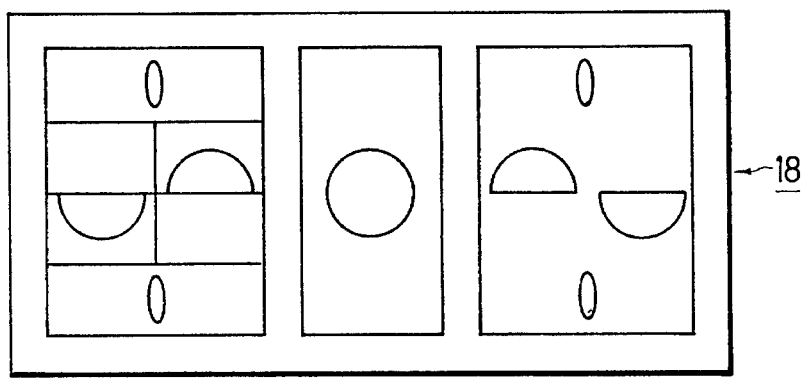

Each of FIGS. 4A, 4B and 4C shows a detecting pattern of the photodetector 18. FIG. 4A shows the pattern in condition that the objective lens 14 is too close to the magneto-optical disk 15. FIG. 4B shows the pattern in condition that the magneto-optical disk 15 is positioned at the focal point of the objective lens 14. FIG. 4C shows the pattern in condition that the objection lens 14 is too far from the magneto-optical disk 15.

The photodetector 18 is divided into eight detecting regions 46 to 50 and 91 and 93 for detecting beam spots formed by the holographic plate 17. The detecting region 46 detects the beam spot 37 which is a zeroth order diffraction light (ordinary light) passing through the holographic plate 17.

The beam spots 38 to 41 are +1st order diffraction lights (extraordinary lights) diffracted at the regions 20, 29, 21 and 22 of the holographic plate 17, respectively. The beam spot 38 is detected on a split line between the detecting regions 47 and 48, the beam spot 39 is detected on a split line between the detecting regions 49 and 50, and the beam spots 40 and 41 are detected at the detecting regions 91 and 92, respectively.

The beam spots 42 to 45 are −1st order diffraction lights (extraordinary lights) diffracted at the regions 29, 20, 22 and 21 of the holographic plate 17, respectively. Each of the beam spots 42 to 45 is detected at the detecting region 93.

In the conventional magneto-optical head system, a laser light emitted from the semiconductor laser 11 becomes a collimated light at the collimator lens 12, and the collimated light is supplied to the beam splitter 13. The collimated light is transmitted through the beam splitter 13 and the objective lens 14 to a magneto-optical disk 15. A reflection light reflected at the magneto-optical disk 15 is transmitted through the objective lens 14 to the beam splitter 13. Then, the reflection light is reflected at the beam splitter 13 and is transmitted through the lens 16 and the holographic plate 17 to the photodetector 18.

At the photodetector 18, a focusing error signal, a tracking error signal and an information signal are detected as follows respectively. In this example, outputs of the detecting regions 46 to 50 and 91 to 93 of the photodetector 18 are indicated by V(46) to V(50) and V(91) to V(93), respectively.

In accordance with Foucault's method, the focusing error signal is given by $$\{V(47)+V(50)\}-\{V(48)+V(49)\}.$$

In accordance with a push-pull method, the tracking error signal is given by $$V(91)-V(92).$$

In accordance with a differential detecting method, the information signal is given by $$V(46)-\{V(47)+V(48)+V(49)+V(50)+V(91)+V(92)+V(93)\},$$

that is the output difference between a zeroth order diffraction light (ordinary light) and the sum of +1st and −1st orders diffraction lights (extraordinary lights).

The information signal may also be given by V(46)−V(93), that is the output difference between a zeroth order diffraction light and a −1st order diffraction light.

At the holographic plate 17, a transmission efficiency of an ordinary light (zeroth order diffraction light) is 100 percent and each diffraction efficiency of extraordinary lights (+1st and −1st orders diffraction lights) is 40 percent in theory. According to the differential detecting method, it is preferable that ordinary and extraordinary lights have the same intensity of light on the photodetector 18 in order to reject a common mode noise caused by intensity fluctuation of the semiconductor laser 11 and fluctuation reflectivity of the magneto-optical disk 15.

According to the conventional magneto-optical head system in which an information signal is detected by using a zeroth order diffraction light and both of −1st and −1st order diffraction lights, ratio of light intensity between the ordinary light and the extraordinary light becomes to be 100:81, so that common mode noise is rejected considerably.

However, the +1st order diffraction light, which is detected at the detecting regions 47 to 50, 91 and 92, is used for detecting both of an error signal and an information signal, so that the +1st order diffraction light is required to be divided into two components. As a result, the electric circuit structure becomes to be complicated.

On the other hand, in case where an information signal is detected by using a zeroth order diffraction light and a −1st order diffraction light, ratio of light intensity between the ordinary light and the extraordinary light is imbalanced, 100:40.5, so that common mode noise is not rejected sufficiently.

It is possible to make the ratio of light intensity between ordinary light and an extraordinary light 1:1 by arranging the holographic plate 17 to provide an optical axis 23 having a predetermined angle to a polarization plane of an incident light. However, a carrier level of a detected signal is decreased due to the arrangement of the holographic plate 17, so that a reproduced C/N (ratio of carrier level to noise level) is decreased.

Figure 5:
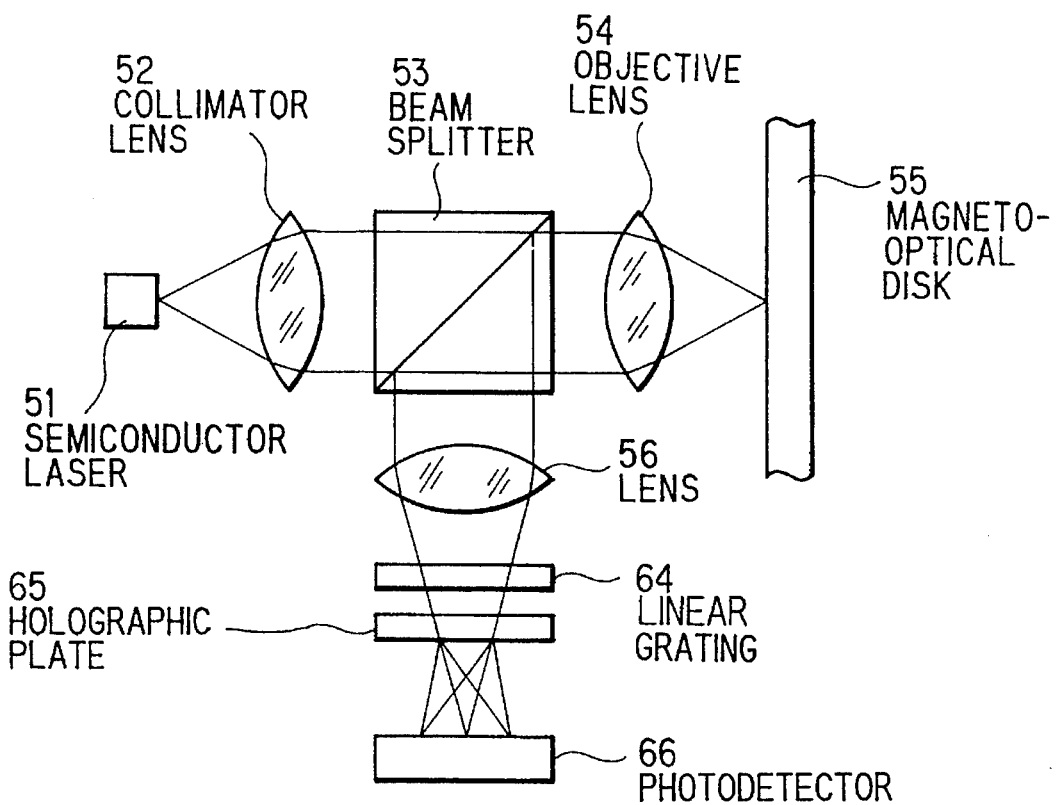
FIG. 5 is a schematic view illustrating a magneto-optical head system of a first preferred embodiment according to the invention.

FIG. 5 shows a magneto-optical head system of a first preferred embodiment according to the invention, which includes a semiconductor laser 51, a collimator lens 52, a beam splitter 53, an objective lens 54, a lens 56, a linear grating 64, a holographic plate 65, and a photodetector 66.

Figure 6:
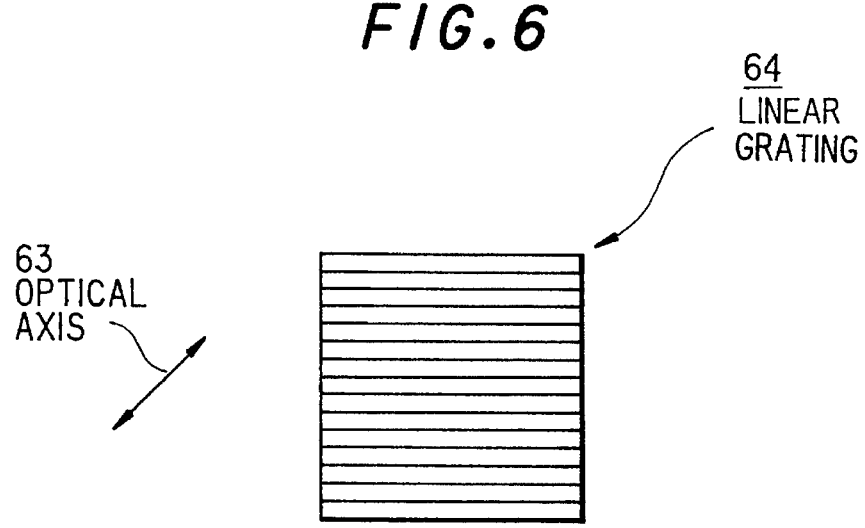
FIG. 6 is a plan view showing a linear grating used in the first preferred embodiment shown in FIG. 5.
Figure 7:
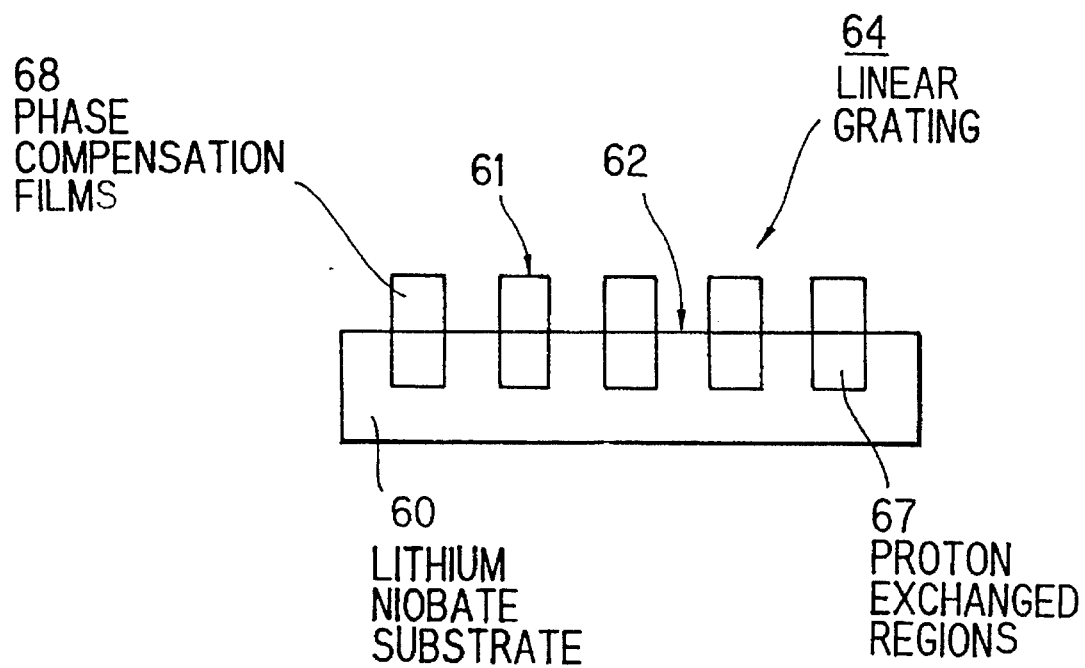
FIG. 7 is a cross sectional view showing the linear grating used in the first preferred embodiment shown in FIG. 5.

FIGS. 6 and 7 show the linear grating 64, which is composed of a single region. The linear grating 64 is arranged to provide an optical axis 63 having forty five degree to polarization plane of an incident light.

The linear grating 64 includes a lithium niobate substrate 60, proton exchanged regions 67 formed on the substrate 60 and phase compensation films 68, which are of $Nb_2O_5$, formed on the proton exchanged regions 67.

The linear grating 64 is formed to have line area 61 and space area 62, which have a predetermined phase difference each other, so that an ordinary light passes through the linear grating 64 and an extraordinary light is diffracted thereat. That is, the phase difference is determined to be zero for the ordinary light having a polarization component orthogonal to the optical axis 63, and to be $\pi$ for the extraordinary light having a polarization component parallel to the optical axis 63, respectively.

Figures 8A, 8B:
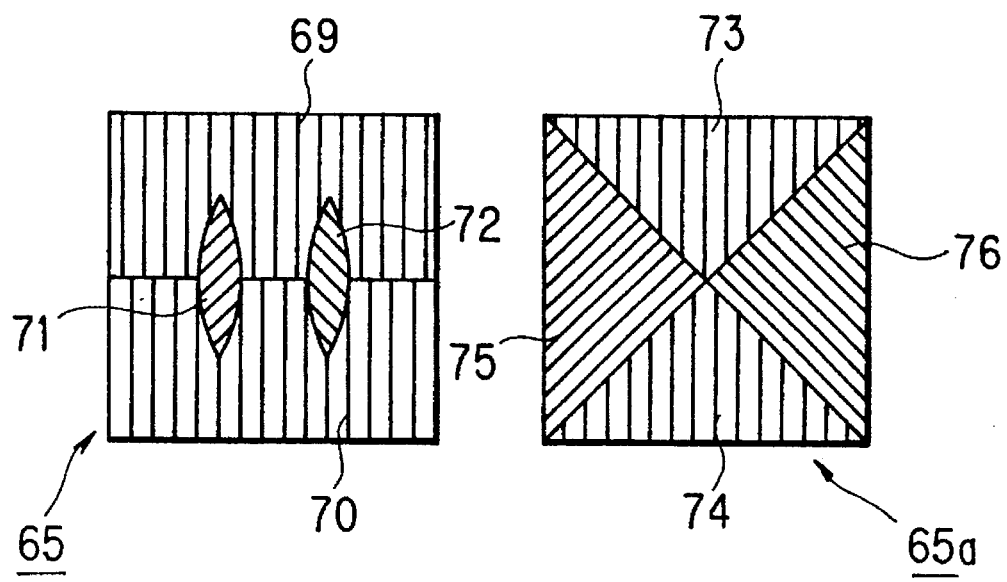
FIGS. 8A and 8B are plan views showing a holographic plate used in the first preferred embodiment shown in FIG. 5.
Figure 9:
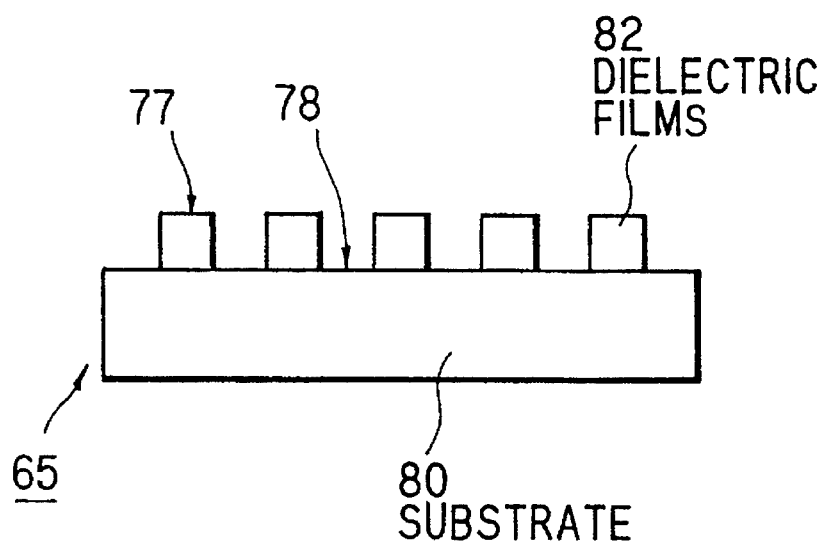
FIG. 9 is a cross sectional view showing the holographic plate used in the first preferred embodiment shown in FIG. 5.

FIG. 8A and FIG. 9 show the holographic plate 65, whose diffraction efficiency is not affected by a polarization of an incident light. The holographic plate 65 is divided into four regions 69 to 72, which have different grating directions each other. The holographic plate 65 is formed by providing eye-shaped regions 71 and 72 on the split line between the regions 69 and 70, respectively. A holographic plate 65a shown in FIG. 8B, which is divided into four regions 73 to 76 by two diagonal lines, can be used instead of the holographic plate 65 shown in FIG. 8A.

The holographic plate 65 includes an isotropic glass substrate 80 and dielectric films 82 formed on the substrate 80, which are of $SiO_2$. The holographic plate 65 is fabricated to have line area 77 and space area 78, so that a desired phase difference between them can be provided by changing the thickness of the dielectric films 82. That is, the holographic plate 65 diffracts an incident light in accordance with a diffraction efficiency based on the phase difference without affecting of the polarization of the incident light.

In this embodiment, at the linear grating 64, the transmission efficiency of zeroth order light and the diffraction efficiency of each of +1st and −1st order diffraction lights are 100 percent and 40.5 percent, in theory, respectively.

On the other hand, a phase difference between the line area 77 and the space area 78 of the holographic plate 65 is determined to be 81.9 degrees, so that the transmission efficiency thereat becomes 57.0 percent and the diffraction efficiencys of each of +1st and −1st order diffraction lights becomes 17.4 percent, in theory, respectively.

Therefore, a diffraction efficiency, which is given by the summing of zeroth and −1st order diffraction lights of the holographic plate 65 in a zeroth order diffraction light (ordinary light) passing through the linear grating 64 becomes 74.4 percent which is equal to a diffraction efficiency, which is given by the sum of zeroth, +1st and −1st order diffraction lights of the holographic plate 65 in +1st and −1st order diffraction lights (extraordinary lights) diffracted at the linear grating 64. Thus, light intensities of ordinary light component and extraordinary light component used for detecting an information signal are equalized.

Figure 10:
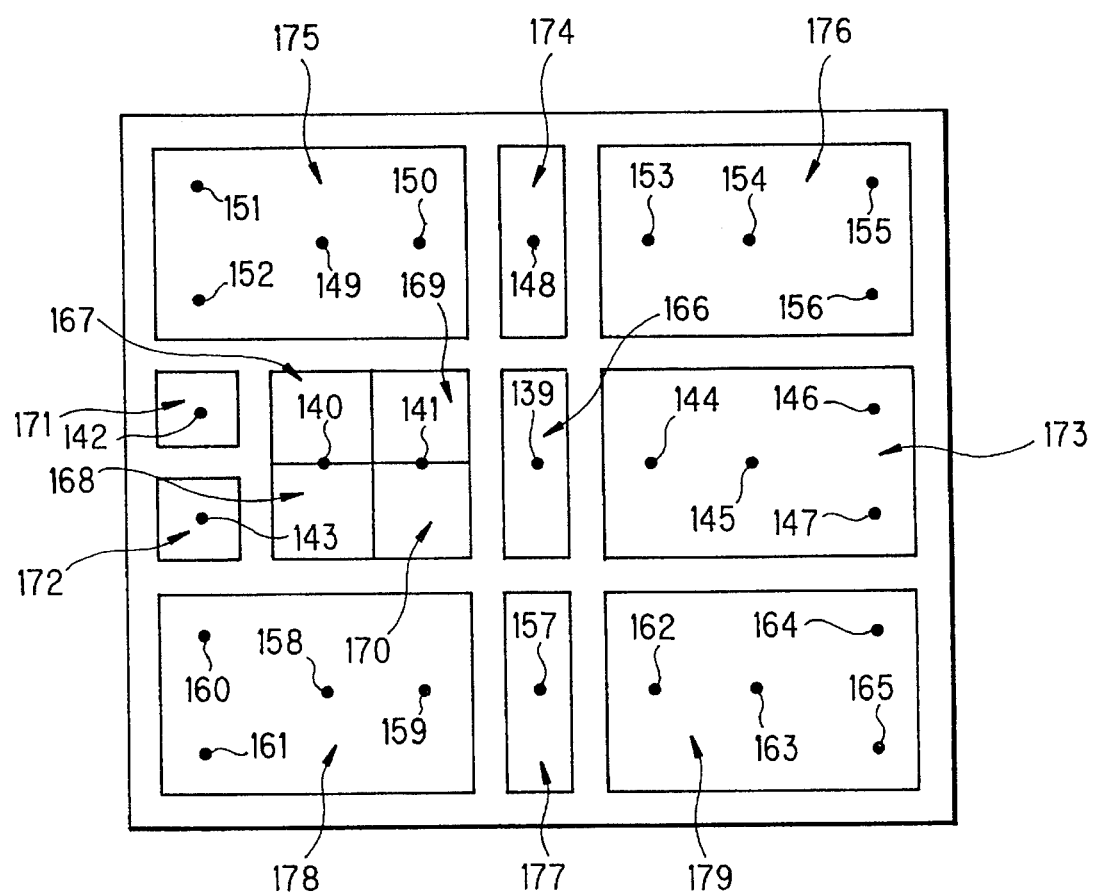
FIG. 10 is a plan view showing a detecting pattern of a photodetector used in the first preferred embodiment shown in FIG. 5.

FIG. 10 shows a detecting pattern of the photodetector 66 in condition where the magneto-optical disk 55 is positioned at the focal point of the objective lens 54. The pattern is divided into fourteen detecting regions 166 to 179 for detecting beam spots 139 to 165.

On the photodetector 166, the beam spot 139 is a zeroth order diffraction light for the linear grating 64 and is also a zeroth order diffraction light (ordinary light) for the holographic plate 65, and the beam spot 139 is detected at the detecting region 166.

The beam spots 140 to 143 are zeroth order diffraction lights (ordinary lights) for the linear grating 64 and are +1st order diffraction lights for the holographic plate 65, which are diffracted at the regions 69 to 72, respectively. The beam spot 140 is detected on a split line between the detecting regions 167 and 168, the beam spot 141 is detected on a split line between the detecting regions 169 and 170, respectively. The beam spots 142 and 143 are detected at the detecting regions 171 and 172, respectively.

The beam spots 144 to 147 are zeroth order diffraction lights (ordinary lights) for the linear grating 64 and are −1st order diffraction lights for the holographic plate 65, which are diffracted at the regions 70, 69, 72 and 71, respectively. Each of the beam spots 144 to 147 is detected at the detecting region 173.

The beam spot 148 is a +1st order diffraction light for the linear grating 64 and is a zeroth order diffraction light for the holographic plate 65, The beam spot 148 is detected at the detecting region 174.

The beam spots 149 to 152 are +1st order diffraction lights for the linear grating 64 and are +1st order diffraction lights for the holographic plate 65, which are diffracted at the regions 69 to 72, respectively. Each of the beam spots 149 to 152 is detected at the detecting region 175.

The beam spots 153 to 156 are +1st order diffraction lights for the linear grating 64 and are −1st order diffraction lights for the holographic plate 65. The beam spots 154, 153, 156 and 155 are diffracted at the regions 69 to 72 of the holographic plate 65, respectively, and each of the beam spots 153 to 156 is detected at the detecting region 176.

The beam spot 157 is a −1st order diffraction light for the linear grating 64 and is a zeroth order diffraction light for the holographic plate 65, and the beam spot 157 is detected at the detecting region 177.

The beam spots 158 to 161 are −1st order diffraction lights for the linear grating 64 and are +1st order diffraction lights for the holographic plate 65, which are diffracted at the regions 69 to 72, respectively. Each of the beam spots 158 to 161 is detected at the detecting region 178.

The beam spots 162 to 165 are −1st order diffraction lights for the linear grating 64 and are −1st order diffraction lights for the holographic plate 65. The beam spots 163, 162, 165 and 164 are diffracted at the regions 69 to 72 of the holographic plate 65, respectively, and each of the beam spots 162 to 165 is detected at the detecting region 179.

In this preferred embodiment, a laser light emitted from the semiconductor laser 51 becomes a collimated light at the collimator lens 52, and the collimated light is supplied to the beam splitter 53. The collimated light is transmitted through the beam splitter 53 and the objective lens 54 to a magneto-optical disk 55. A reflection light reflected at the magneto-optical disk 55 is transmitted through the objective lens 54 to the beam splitter 53. Then, the reflection light is reflected at the beam splitter 53 and is transmitted through the lens 56, the linear grating 64 and the holographic plate 65 to the photodetector 66.

At the photodetector 66, a focusing error signal, a tracking error signal and an information signal on the magneto-optical disk 55 are detected as follows. In this embodiment, outputs of the detecting regions 166 to 179 of the photodetector 66 are indicated by V(166) to V(179), respectively.

The focusing error signal is given, in accordance with Foucault's method, by

{V(167)+V(170)}−{V(168)+V(169)}.

The tracking error signal is given, in accordance with a push-pull method, by

V(71)−V(72).

The information signal is given, in accordance with a differential detecting method, by

{V(166)+V(173)}−{V(174)+V(175)+V(176)+V(177)+V(178)+V(179)}.

In this case, it can be considered that the detecting region sets 166 and 173, 174 to 176, and 177 to 179 are three single regions, respectively.

As described above, according to the embodiment, an information signal is detected in accordance with an ordinary light component and an extraordinary light component which have the same light intensity, so that common mode noise is rejected without decreasing of carrier level of the detected signal. Further, an information signal and an error signal are detected in accordance with different lights each other, so that a diffraction light is not necessary to be divided to detect them.

In this embodiment, the arrangement order is not limited among the lens 56, the linear grating 64 and the holographic plate 65. Further, more than two components may be selected to be combined from the beam splitter 53, the lens 56, the linear grating 64 and the holographic plate 65.

Figure 11:
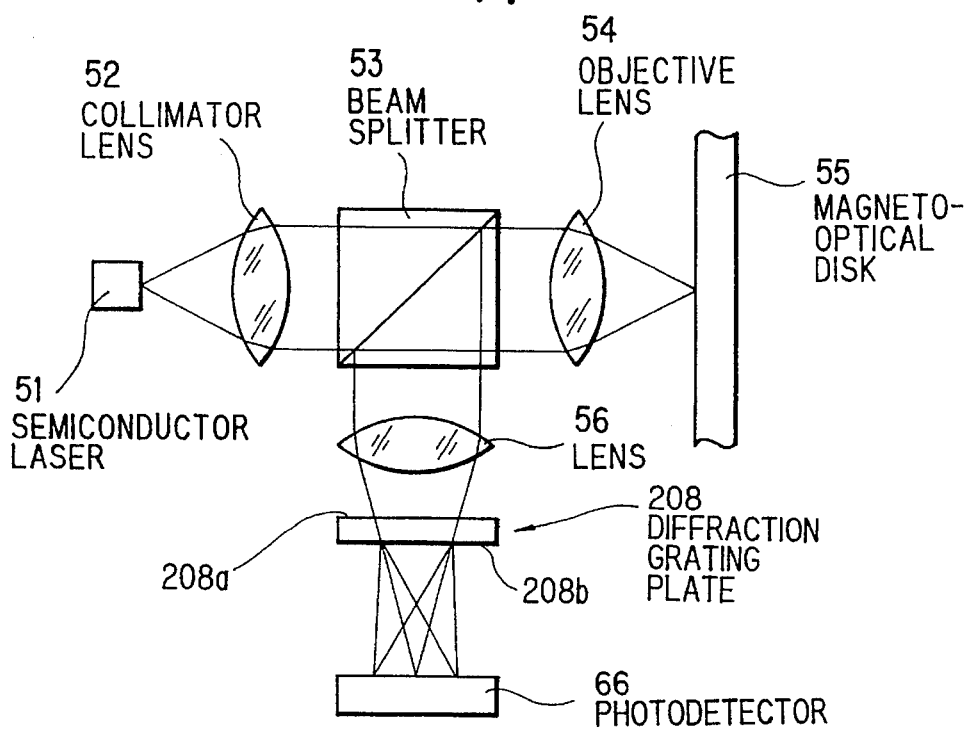
FIG. 11 is a schematic view illustrating a magneto-optical head system of a second preferred embodiment according to the invention.

FIG. 11 shows a magneto-optical head system of a second preferred embodiment according to the invention, which includes a semiconductor laser 51, a collimator lens 52, a beam splitter 53, an objective lens 54, a lens 56, a diffraction grating plate 208, and a photodetector 66. In this embodiment, the different structure from the first preferred embodiment shown in FIGS. 5 to 10 will be explained mainly.

Figure 12:
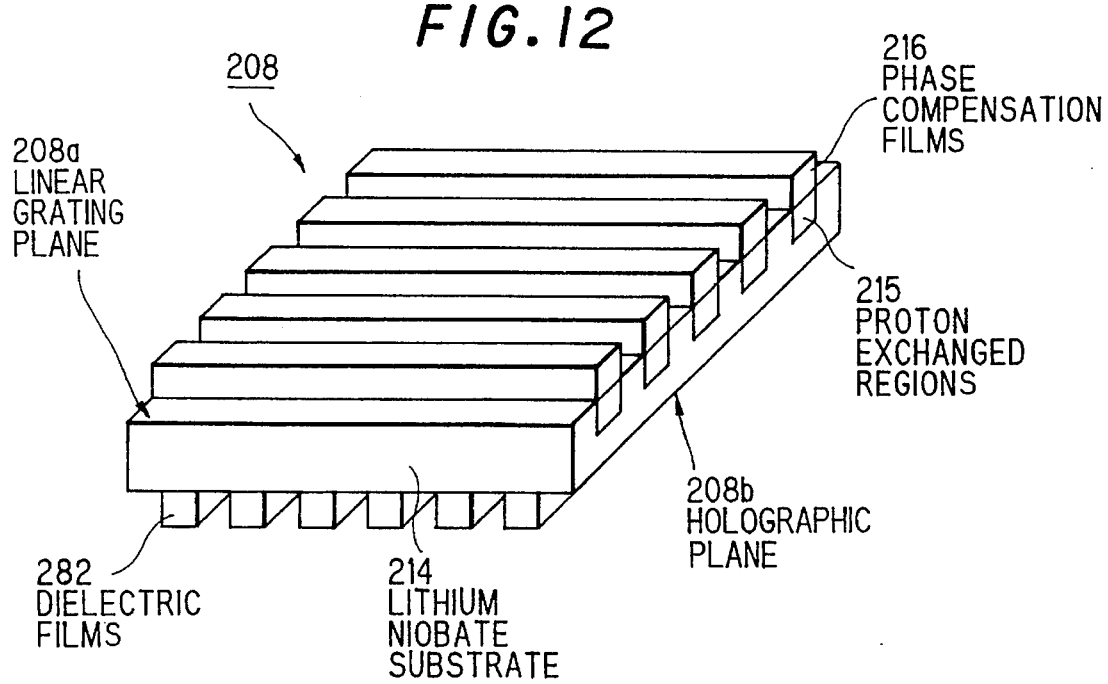
FIG. 12 is a perspective view illustrating a diffraction grating plate used in the second preferred embodiment shown in FIG. 11.

FIG. 12 shows the diffraction grating plate 208 having a linear grating plane 208a corresponding to the linear grating 64 shown in FIG. 6 and a holographic plane 208b corresponding to the holographic plate 65 shown in FIGS. 8A and 8B.

The diffraction grating plate 208 includes a lithium niobate substrate 214, proton exchanged regions 215 formed on the substrate 214, phase compensation films 216, which are of $Nb_2O_5$, formed on the plane 208a, and dielectric films 282 formed on the plane 208b.

The linear grating plane 208a is fabricated to provide an optical axis (not shown) having forty-five degree to a polarization plane of an incident light. The linear grating plane 208a has a predetermined phase difference between a line area and a space area, so that an ordinary light passes therethrough and an extraordinary light is diffracted thereat.

In the same manner as the first preferred embodiment, a reflection light reflected at a magneto-optical disk 55 is divided into zeroth, +1st and −1st orders diffraction lights at the linear grating plane 208a and each of the divided lights is further divided into zeroth, +1st and −1st orders diffraction lights at the holographic plane 208b, respectively.

According to this embodiment, the same effect as the first preferred embodiment can be obtained. In this embodiment, the linear grating plane 208a and the holographic plane 208b of the diffraction grating plate 208 may be arranged upside down.

Figure 13:
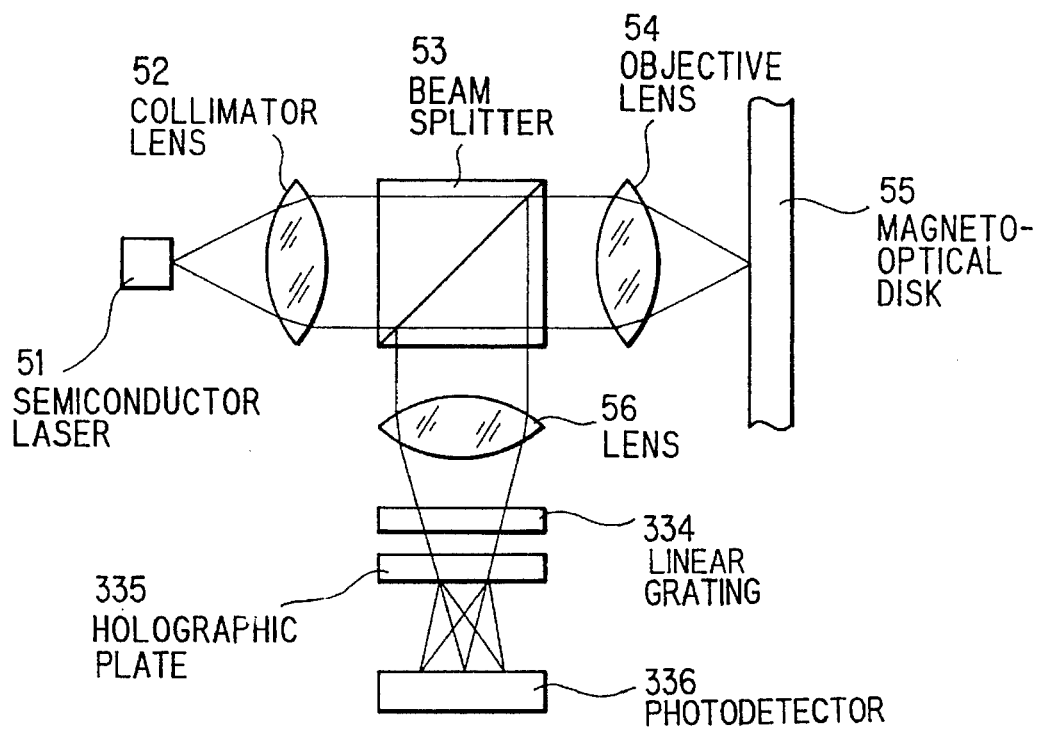
FIG. 13 is a schematic view illustrating a magneto-optical head system of a third preferred embodiment according to the invention.

FIG. 13 shows a magneto-optical head system of a third preferred embodiment according to the invention. This system includes a semiconductor laser 51, a collimator lens 52, a beam splitter 53, an objective lens 54, a lens 56, a linear grating 334, a holographic plate 335, and a photodetector 336.

FIG. 14 shows the linear grating 64, which is arranged to provide an optical axis 337 having forty-five degree to a polarization plane of an incident light. The linear grating 334 has a structure which is the same as the linear grating 64 of the first preferred embodiment shown in FIG. 7.

FIG. 15A shows the holographic plate 335 divided into four regions 389 to 392, which have different grating directions each other in the same manner as the holographic plate 65 of the first preferred embodiment shown in FIG. 8A. The holographic plate 335 is arranged to provide an optical axis 397 which is orthogonal to the optical axis 337 of the linear grating 334, that is, the optical axis 397 has minus forty five degree to a polarization plane of an incident light. In this embodiment, a holographic plate shown in FIG. 15B can be used instead of the holographic plate 65 shown in FIG. 15A.

The holographic plate 335 basically has the same structure as the linear grating 64 of the first preferred embodiment shown in FIG. 9. However, a phase difference between a line area and a space area of the holographic plate 335 is determined to be zero for an ordinary light orthogonal to the optical axis 397, and zero to $\pi$ for an extraordinary light within parallel to the optical axis 397, respectively. Thus, an ordinary light passes through the holographic plate 335 and an extraordinary light is diffracted at the holographic plate 335 in accordance with a diffraction efficiency based on the phase difference thereof.

In the third preferred embodiment, only an ordinary light for the linear grating 334 is diffracted at the holographic plate 335, so that an extraordinary light for the linear grating 334 passes through the holographic plate 335.

In theory, at the linear grating 334, the transmission efficiency of zeroth order light (ordinary light) and the diffraction efficiency of each of +1st and −1st orders diffraction lights (extraordinary lights) are 100 percent and 40.5 percent, respectively.

On the other hand, at the holographic plate 335, the phase difference between the line area and the space area is determined to be 68.8 degree for an extraordinary light, so that the transmission efficiency of zeroth order light and the diffraction efficiencys of each of +1st and −1st order diffraction lights become 68.1 percent and 12.9 percent for an extraordinary light in theory, respectively.

Therefore, the diffraction efficiency given by summing zeroth and −1st order diffraction lights for the holographic plate 335 in a zeroth order diffraction light (ordinary light) for the linear grating 334 becomes to be 81.0 percent which is equal to the diffraction efficiency given by summing a zeroth order diffraction light for the holographic plate 335 and +1st and −1st orders diffraction lights (extraordinary light) for the linear grating 334. As a result, light quantities of ordinary light component and extraordinary light component used for detecting an information signal are equalized.

Figure 16:
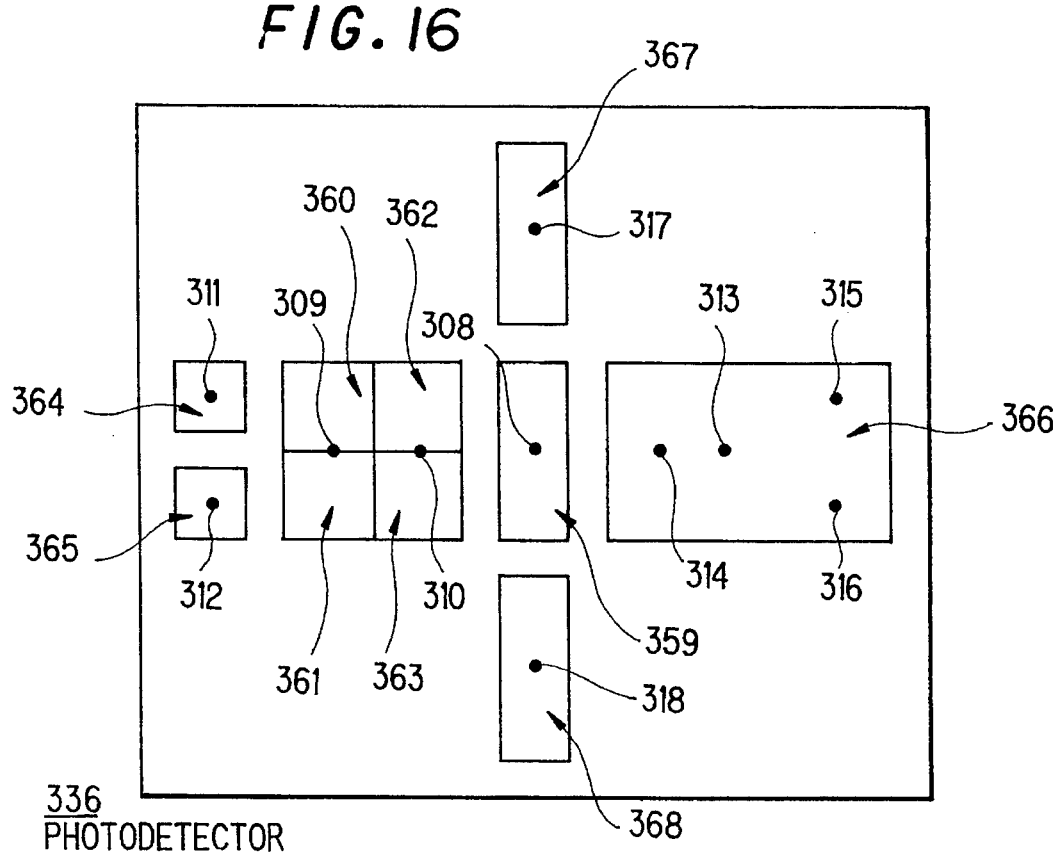
FIG. 16 is a plan view showing a detecting pattern of a photodetector used in the third preferred embodiment shown in FIG. 13.

FIG. 16 shows a detecting pattern of the photodetector 336 in condition where a magneto-optical disk 355 is positioned at the focal point of the objective lens 354. The pattern is divided into ten detecting regions 359 to 368 for detecting beam spots 308 to 318.

On the photodetector 336, the beam spot 308 is a zeroth order diffraction light (ordinary light) for the linear grating 334 and is also a zeroth order diffraction light for the holographic plate 335, and the beam spot 308 is detected at the detecting region 359.

The beam spots 309 to 312 are zeroth order diffraction lights (ordinary lights) for the linear grating 334 and are +1st order diffraction lights for the holographic plate 335, which are diffracted at the regions 389 to 392, respectively. The beam spot 309 is detected on a split line between the detecting regions 360 and 361, the beam spot 310 is detected on a split line between the detecting regions 362 and 363, respectively. The beam spots 311 and 312 are detected at the detecting regions 364 and 365, respectively.

The beam spots 313 to 316 are zeroth order diffraction lights (ordinary lights) for the linear grating 334 and are −1st order diffraction lights for the holographic plate 335. The beam spots 313, 314, 316 and 315 are diffracted at the regions 389 to 392 of the holographic plate 335, respectively, and each of the beam spots 313 to 316 is detected at the detecting region 366.

The beam spot 317 is a +1st order diffraction light for the linear grating 334 and is a zeroth order diffraction light for the holographic plate 335, and is detected at the detecting region 367.

The beam spot 318 is a −1st order diffraction light for the linear grating 334 and is a zeroth order diffraction light for the holographic plate 335, and is detected at the detecting region 368.

At the photodetector 336, a focusing error signal, a tracking error signal and an information signal are detected as follows. In this embodiment, outputs of the detecting regions 359 to 368 of the photodetector 336 are indicated by V(359) to V(368), respectively, The focusing error signal is given, in accordance with Foucault's method, by

{V(360)+V(363)}−{V(361)+V(362)}.

The tracking error signal is given, in accordance with a push-pull method, by

V(364)−V(365).

The information signal is given, in accordance with a differential detecting method, by

{V(359)+V(366)}−{V(367)+V(368)}.

In this case, it can be considered that the detecting regions 359 and 366 are formed to be single region.

In this embodiment, the arrangement order among the lens 56, the linear grating 334 and the holographic plate 335 is not limited. Further, more than two components selected from the beam splitter 53, the lens 56, the linear grating 334 and the holographic plate 335 may be combined.

Figure 17:
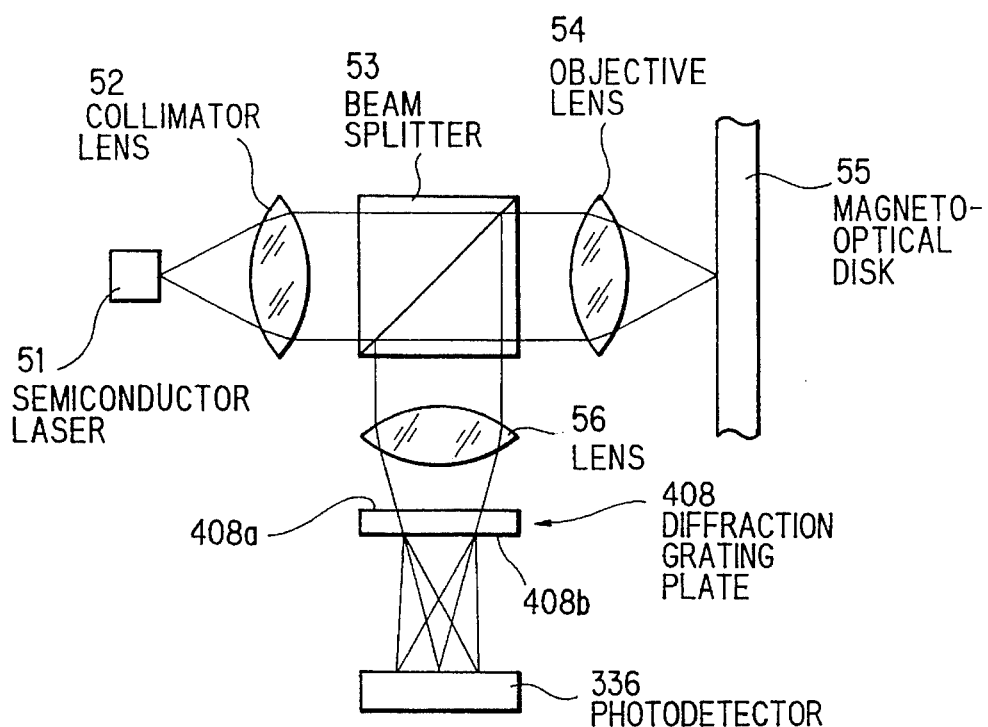
FIG. 17 is a schematic view illustrating a magneto-optical head system of a fourth preferred embodiment according to the invention.

FIG. 17 shows a magneto-optical head system of a fourth preferred embodiment according to the invention, wherein like parts are indicated by like reference numerals, as used in above mentioned figures. The magneto-optical head system includes a semiconductor laser 51, a collimator lens 52, a beam splitter 53, an objective lens 54, a lens 56, a diffraction grating plate 408, and a photodetector 336.

Figure 18:
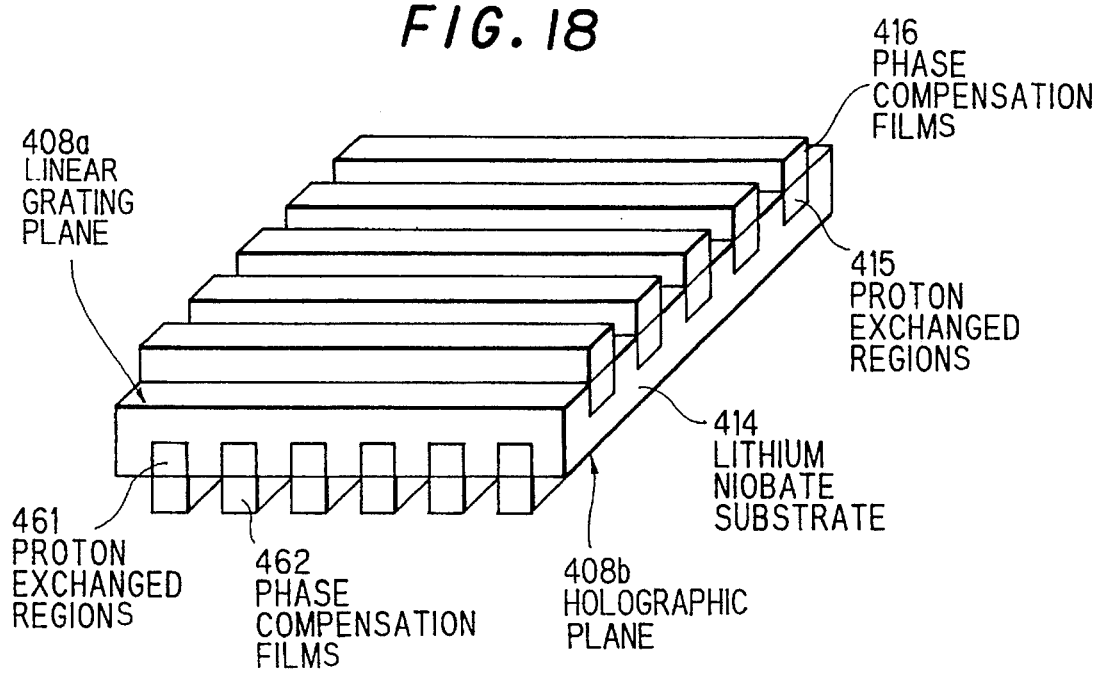
FIG. 18 is a perspective view illustrating a diffraction grating plate used in the fourth preferred embodiment shown in FIG. 17.

FIG. 18 shows the diffraction grating plate 408. The diffraction grating plate 408 has a linear grating plane 408a corresponding to the linear grating 334 shown in FIG. 14 and a holographic plane 408b corresponding to the holographic plate 335 shown in FIGS. 15A and 15B.

The diffraction grating plate 408 is composed of a lithium niobate substrate 414, a proton exchanged regions 415 formed on the substrate 414, a phase compensation films 416 formed on the plane 408a, proton exchanged regions 461 formed on the substrate 414, phase compensation films 482 formed on the plane 408b.

The linear grating plane 408a is structured to provide an optical axis (not shown) having forty five degree to a polarization plane of an incident light. At the linear grating plane 408a, a phase difference between a line area and a space area is determined to be zero for an ordinary light orthogonal to the optical axis, and to be π for an extraordinary light parallel to the optical axis, respectively. Thus, an ordinary light passes through the linear grating plane 408a and an extraordinary light is diffracted at the linear grating plane 408a.

At the holographic plane 408b, a phase difference between a line area and a space area is determined within zero to π for an ordinary light , and to be 2π for an extraordinary light, respectively.

In the same manner as the third preferred embodiment, a focusing error signal, a tracking error signal and an information signal are detected at the photodetector 336.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching herein set forth.

What is claimed is:

1. A magneto-optical head system for detection of error and information signals by diffraction lights, comprising:

a light source for emitting a light;

a focusing lens for focusing said light emitted from said light source on a magneto-optical disk;

a collimating lens for collimating a reflecting light reflected at said magneto-optical disk;

a first diffraction grating for diffracting a first predetermined polarizing component of said reflection light;

a second diffraction grating for diffracting only a second predetermined polarizing component of a light supplied from said first diffraction grating, said second predetermined polarizing component being orthogonal to said first polarizing component; and a photodetector having error and information detection regions for detecting error of a magneto-optical head relative to said magneto-optical disk and information stored in said magneto-optical disk, said error detection region and said information detection regions being separate and distinct regions, and said error detection region receiving the zeroth order diffraction light of said first diffraction grating and the +1st order diffraction light of said second diffraction grating, and said information detection regions receiving diffraction light of said second diffraction grating which is not received by said error detection region and receiving the +1st and −1st order diffraction lights of said first diffraction grating.

2. A magneto-optical head system, according to claim 1, wherein said first diffraction grating is a linear grating, and said second diffraction grating is a holographic plate, respectively.

3. A magneto-optical head system for detection of error and information signals by diffraction lights, according to claim 1, wherein said first and second diffraction gratings are formed, respectively, on a first surface of a substrate and a second surface opposite to said first surface of said substrate.

4. A magneto-optical head system for detection of error and information signals by diffraction lights, according to claim 1, wherein said error detection region comprises a tracking error detection region and a focusing error detection region that are separate and distinct regions.

5. A magneto-optical head system for detection of error and information signals by diffraction lights, comprising:

a light source for emitting a light;

a focusing lens for focusing said light emitted from said light source on a magneto-optical disk;

a collimating lens for collimating a reflecting light reflected at said magneto-optical disk;

a first diffraction grating for diffracting a first predetermined polarizing component of said reflection light;

a second diffraction grating for diffracting only a second predetermined polarizing component of a light supplied from said first diffraction grating, said second predetermined polarizing component being orthogonal to said first polarizing component; and a photodetector having error and information detection regions for detecting error of a magneto-optical head relative to said magneto-optical disk and information stored in said magneto-optical disk, said error detection region and said information detection regions being separate and distinct regions, and said error detection region receiving the zeroth order diffraction light of said first diffraction grating and the +1st order diffraction light of said second diffraction grating, and said information detection regions receiving diffraction light of said second diffraction grating which is not received by said error detection region and receiving the +1st and −1st order diffraction lights of said first diffraction grating; wherein:

said photodetector has first to ninth regions, said first region receiving a light spot of the zeroth order diffraction light of said first diffraction grating and the zeroth order diffraction light of said second diffraction grating, said second region receiving light spots of the zeroth order diffraction light of said first diffraction grating and the +1st order diffraction light of said second diffraction grating, said third region receiving light spots of the zeroth order diffraction light of said first diffraction grating and the −1st order diffraction light of said second diffraction grating, said fourth region receiving a light spot of the +1st order diffraction light of said first diffraction grating and the zeroth order diffraction light of said second diffraction grating, the fifth region receiving light spots of the +1st order diffraction light of said first diffraction grating and the +1st order diffraction light of said second diffraction grating, said sixth region receiving light spots of the +1st order diffraction light of said first diffraction grating and the −1st order diffraction light of said second diffraction grating, said seventh region receiving a light spot of the −1st order diffraction light of said first diffraction grating and the zeroth order diffraction light of said second diffraction grating, said eight region receiving light spots of the −1st order diffraction light of said first diffraction grating and the +1st order diffraction light of said second diffraction grating, and said ninth region receiving light spots of the −1st order diffraction light of said first diffraction grating and the −1st order diffraction light of said second diffraction grating.

6. A magneto-optical head system for detection of error and information signals by diffraction lights, comprising:

a light source for emitting a light;

a focusing lens for focusing said light emitted from said light source on a magneto-optical disk;

a collimating lens for collimating a reflecting light reflected at said magneto-optical disk;

a first diffraction grating for diffracting a first predetermined polarizing component of said reflection light;

a second diffraction grating for diffracting only a second predetermined polarizing component of a light supplied from said first diffraction grating, said second predetermined polarizing component being orthogonal to said first polarizing component; and a photodetector having error and information detection regions for detecting error of a magneto-optical head relative to said magneto-optical disk and information stored in said magneto-optical disk, said error detection region and said information detection regions being separate and distinct regions, and said error detection region receiving the zeroth order diffraction light of said first diffraction grating and the +1st order diffraction light of said second diffraction grating, and said information detection regions receiving diffraction light of said second diffraction grating which is not received by said error detection region and receiving the +1st and −1st order diffraction lights of said first diffraction grating; wherein:

said photodetector has first to fifth regions, said first region receiving a light spot of the zeroth order diffraction light of said first diffraction grating and the zeroth order diffraction light of said second diffracting grating, said second region receiving light spots of the zeroth order diffraction light of said first diffraction grating and the +1st order diffraction light of said second diffraction grating, said third region receiving light spots of the zeroth order diffraction light of said first diffraction grating and the −1st order diffraction light of said second diffraction grating, said fourth region receiving a light spot of the +1st order diffraction light of said first diffraction grating, and said fifth region receiving a light spot of the −1st order diffraction light of said first diffraction grating.

\* \* \* \* \*

UNITED STATES PATENT AND TRADEMARK OFFICE
CERTIFICATE OF CORRECTION

PATENT NO. : 5,453,963
DATED : September 26, 1995
INVENTOR(S) : Ryuichi KATAYAMA and Yutaka YAMANAKA It is certified that error(s) appears in the above-identified patent and that said Letters Patent is hereby corrected as shown below:

Col. 1, line 54, after "lights" insert --1:1--.

Signed and Sealed this

Twenty-third Day of April, 1996

Attest:

BRUCE LEHMAN

Attesting Officer

Commissioner of Patents and Trademarks